United States Patent Office 3,393,990
Patented July 23, 1968

3,393,990
STABILIZED PESTICIDE COMPOSITIONS AND METHODS FOR MAKING SAME
Robert J. Geary, Vero Beach, Fla., assignor to Plant Products Corp., Vero Beach, Fla., a corporation of Florida
No Drawing. Filed July 15, 1965, Ser. No. 472,306
19 Claims. (Cl. 71—65)

ABSTRACT OF THE DISCLOSURE

The reaction product of
(1) about 0.5 mole of an interpolymer of
 (a) an alkyl vinyl ether of from 1 to 18 carbon atoms in the alkyl moiety with
 (b) an $\alpha,\beta$-ethylenically unsaturated dicarboxylic acid anhydride, said interpolymer having a K value of about 10 to 200, and
(2) 100 moles of an aryl hydroxy compound selected from the group consisting of 2-hydroxybenzophenones, alkali lignates, hydroxy coumarins, and oxyphenyl benzotriazoles, useful for stabilizing agricultural pesticidal compositions.

---

The present invention relates to pesticide compositions, and more particularly, to improved, stabilized, pesticidal compositions, the latter, preferably characterized as agricultural pesticides.

The successful control of agricultural pests presents innumerable problems. Broadly, these problems fall into three categories. The first involves the efficiency or activity of the pesticide for the particular problem at hand. The second is concerned with the safety of the pesticide, not only to man and animals but to plants as well. The third consideration is the economic one. This point is directly related to the value of what is being protected as well as the quality and quantity of competitive products. The above problem classification is relevant whether the pest is an insect, fungus, weed, nematode, virus, or the like.

In considering and selecting a particular pesticide for a specific application, it is, of course, apparent that the pesticide must be effective for the job. In most instances, there is an extremely small margin of tolerance by the host or environment to that dosage of the pesticide which will destroy or inhibit the growth of the pest, without doing substantial damage to the host or environment. Thus, too little a concentration will not destroy the pest whereas too large a dosage may injure not only the host to be protected but may, indirectly, be injurious to animals and man as well. This is generally true of such diverse pesticides as the organic phosphorous compounds, carbamates, rotenone, pyrethrins, allethrins, and the chlorinated hydrocarbons such as DDT, Endrin, Dieldrin, etc., and the like. The outstanding utilities and commercial importance of these pesticidal exemplifications is well known. The precautions necessary in the handling and application are also well known, as evidenced by the great care and cautious use, for example, of the organic phosphorous compounds. The contamination of food products as well as animal feed with pesticides, and the establishment by the Food and Drug Administration of maximum residues on such products, points up even more strongly the need for obtaining the maximum and optimum performance from pesticides. With such pesticides as herbicides, the problem presented is a parallel situation. Undesirable species of plant growth are to be controlled, as by destruction in one form or another at some stage of development from the seed to the mature plant, and this must be done without harm to the crop or host that it is desired to foster. It is quite clear and evident, therefore, that it is not only desirable, but in a preponderance of situations it is essential, that the minimum amount of pesticide be employed consonant with the required effect.

Among the techniques for maximizing the pesticidal activity of a given product, is the use thereof in a maximum state of subdivision, often and preferably in the colloidal particle size range. This, of course obtains with normally solid pesticides or those which are used on normally solid carriers or in admixture with ingredients which yield a normally solid composition. In such a fine state of subdivision, the pesticide exhibits its greatest effect due to the maximum availability of active ingredient by virtue of the tremendous surface area which can come into play and thereby produce a maximum effective concentration of active principle.

The same basic requirements for obtaining the maximum effects from the pesticide, however, tend to work against such effects being of any substantially prolonged nature. Thus, employing the pesticide in fine particle form renders the said pesticide more susceptible to the degradative effects of the environment. In the finely divided state, the pesticides are particularly susceptible to degradation by the actinic radiations ever present. The ultra violet light from sunlight is a powerful destructive agent for halogenated hydrocarbons such as Endrin and Dieldrin, for the urea herbicides, as well as the general class of organic pesticides. Yet this same sunlight is essential for plant growth. Both pesticide and sunlight are, therefore, necessary and in order to achieve the optimum results more pesticide is needed than would be indicated in the absence of the sunlight. Similarly, where the pesticide is a foliar fungicide, for example, it is usually desirable to apply the active principle directly to the plant, and particularly, to the leaves or foliage of the plant. Rain, a so obviously needed factor, tends to wash away the pesticide from the site of application where it is most sorely needed. Again, higher concentrations must be employed if any substantial benefit is to derive from the use of the pesticide.

Still another illustration of the antagonistic interplay of the forces of nature with man's necessary use of pesticides can be found in the action of the various microorganisms found in the soil, and most necessary to "fix" nitrogen so that it may be assimilated by the plant or necessary to convert undigestible nutrients to digestible or assimilative nutrients. These organisms also accelerate the decomposition of the pesticide, as they do with organic material generally.

Finally, one can cite the battle between the need for maintaining the colloidal nature of the soil particle, so necessary to retain the fertility of the soil and the concomitant inactivation of the pesticide or its immobilization as a direct function of the said colloidal state of the soil.

It is therefore, manifest, that the desideratum in the use of the pesticides would be the achievement of total activity such as would result from the use thereof at the maximum pesticidal potential, e.g. maximum surface area, in an inert environment, i.e. in the absence of the aforementioned degenerative factors such as sunlight, rain, soil micro-organisms, soil structure, and the like.

It is, therefore, an object of the present invention to provide pesticidal compositions which are protected against the degradative effects of the normal plant environment.

It is another object of this invention to provide pesticidal compositions which are stabilized against the degradative effects of actinic radiation and, particularly, against the effects of ultra violet light as emanating from the sun in the form of sunlight.

It is still another object of the present invention to provide pesticidal compositions which are substantially unaffected by rain and particularly, dissolution thereby.

It is still another further object of this invention to provide pesticidal compositions which resist and inhibit the action of micro-organisms, and particularly, soil micro-organisms.

It is another object of this invention to provide pesticidal compositions which are non-agglomerative.

Another object of this invention is to provide pesticidal compositions which are stabilized and protected against degradation or decomposition by the catalytic or other activity of metals and metal compounds, and in particular, chelating and sequestering substances.

Still another major object of the present invention is to provide pesticidal compositions which maintain maximum and effective activity over prolonged periods of time under normal plant environmental conditions.

It is another further object of this invention to provide processes for the production of the pesticidal compositions of this invention.

Still another object of this invention is to provide new and useful polymeric compositions, and particularly, such compositions which are resistant to, and protected against the degradative effects of the normal plant environment.

A still further object of this invention is to provide new and useful polymeric compositions which are outstanding in affording protection and resistance to degradation to pesticides without minimizing the pesticidal activity thereof.

Another object of this invention is to provide processes for the production of the new and useful polymeric compositions of the present invention.

Other objects of the present invention will appear hereinafter as the description proceeds.

The attainment of the objects of the present invention is made possible by combining certain unique compounds from specified classes of compounds whereby the new and useful polymeric products are forthcoming, and then combining such polymers with a pesticide or combination of pesticides.

The essential polymer-forming components comprise compounds selected from two basic classes of organic substances. The first class consists of a vinyl-carboxylic interpolymer, and specifically, an interpolymer of an alkyl vinyl ether with an $\alpha,\beta$-ethylenically unsaturated dicarboxylic acid anhydride. Such interpolymers are, in general, well known, and contain the comonomer moieties in approximately equimolar amounts, that is, they are present in the interpolymer in a ratio of about 1:1. There is some latitude in this ratio with one component exceeding the other by as much as about 50%. In other words, the possible range of the ratios of the two comonomers may be from 1.2:0.8 to 0.8:1.2, all on a molar basis. The preferred alkyl vinyl ethers are those containing from one to 18 carbon atoms in the alkyl moiety and within this range, the most preferred compounds are the lower-alkyl vinyl ethers.

The following are illustrative of the alkyl vinyl ethers which are contemplated herein as components of the interpolymers which are employed in the present invention:

methyl vinyl ether
ethyl vinyl ether
iso-propyl vinyl ether
n-propyl vinyl ether
iso-butyl vinyl ether
tert. butyl vinyl ether
n-amyl vinyl ether
n-hexyl vinyl ether
iso-hexyl vinyl ether
iso-octyl vinyl ether
nonyl vinyl ether
decyl vinyl ether
lauryl vinyl ether
cetyl vinyl ether, and the like.

The $\alpha,\beta$-ethylenically unsaturated dicarboxylic acid anhydrides are preferably maleic anhydride, and the substituted derivatives thereof such as:

monochloro-maleic anhydride
dichloro-maleic anhydride
methyl maleic anhydride (citraconic anhydride)
dimethyl maleic anhydride
ethyl maleic anhydride
phenyl maleic anhydride
benzyl maleic anhydride, as well as other halogen, alkyl, aryl, aralkyl, hetero substituted maleic anhydrides.

The vinyl-carboxylic acid anhydride interpolymers which may be employed in the processes and compositions of the present invention may vary widely in their molecular weights. Variations in the polymerization techniques including catalyst, temperature, pressure, solvents, diluents, water, ratio of reactants, etc. yield interpolymers which vary in their molecular weights. A manifestation of such varying molecular weights is the viscosity characteristic of the interpolymer, which is generally a measure of the average molecular weight distribution. Another indication of the average molecular weight of a polymeric material is the K value thereof, which may be calculated from viscosity data. The determination of the K value is fully described in "Modern Plastics," vol. 23, No. 3, pp. 157–61, 212, 214, 216 and 218 (1945), and is defined as 1000 times $k$ in the empirical relative viscosity equation:

$$\frac{\log_{10} \eta_{\text{rel.}}}{C} = \frac{75k^2}{1+1.5kC} = k$$

wherein C is the concentration in grams per 100 cc. polymer solution and $\eta_{\text{rel.}}$ is the ratio of viscosity of the solution to that of the pure solvent. The K values are reported as 1000 times the calculated viscosity coefficient in order to avoid the use of decimals.

The interpolymers which are employed in the present invention are those having a K value of from about 10 to about 200. The preferred values range from about 10 to about 100 and these values represent products having a specific viscosity $\eta_{\text{(sp.)}}$ of from about 0.1 to about 2.5. The specific viscosity equals the relative viscosity minus one.

Among specific interpolymers which may be used in the compositions and processes of the present invention, mention of the following, as illustrative only, made be made:

methyl vinyl ether-maleic anhydride (specific viscosity of 0.5)
methyl vinyl ether-maleic anhydride (specific viscosity of 1.2)
methyl vinyl ether-maleic anhydride (specific viscosity of 1.7)
methyl vinyl ether-maleic anhydride (specific viscosity of 2.5)
ethyl vinyl ether-maleic anhydride (specific viscosity of 0.9)
isobutyl vinyl ether-maleic anhydride (specific viscosity of 1.6)
cetyl vinyl ether-maleic anhydride (specific viscosity of 1.4)
methyl vinyl ether-maleic anhydride (specific viscosity of 0.2)
methyl vinyl ether-methyl maleic anhydride (specific viscosity of 1.5)
methyl vinyl ether-monochloromaleic anhydride (specific viscosity of 0.8)
ethyl vinyl ether-benzyl maleic anhydride (specific viscosity of 1.7)
lauryl vinyl ether-phenyl maleic anhydride (specific viscosity of 2.2)

The second class of compounds representing the second of the two essential components of the polymers of and used in the present invention consists of an aryl hydroxide actinic radiation stabilizer. By combining such stabilizer compounds with the aforementioned vinyl- carboxylic interpolymers, new polymers are obtained which are not only resistant to the degradative effects of actinic radiation, but which may be used to protect other organic material at well. As pointed out above the prime radiations are the ultra violet rays. Among the compounds which may be employed as deterents against degradation by ultraviolet and as illustrative of the aryl hydroxide stabilizer component are the following general classes of compounds:

(A) simple phenols, i.e. one aromatic ring,
(B) hydroxy benzotriazoles,
(C) hydroxy coumarins,
(D) hydroxy benzophenones,
(E) phenolic polymers, e.g. lignin and derivatives thereof.

Examples of these various stabilizers, and as merely illustrative, are the following:

ammonium lignate
sodium lignate
potassium lignate
amine lignates
2'-hydroxyphenyl benzotriazole
2,4-dihydroxy benzophenone
2-hydroxy-4-methoxy benzophenone
2,2',4,4'-tetrahydroxy benzophenone
2,2'-dihydroxy-4,4'-dimethoxy benzophenone
2,2'-dihydroxy-4-methoxy benzophenone
2-hydroxy-4-methoxy-4'-chloro benzophenone
2-hydroxy-5-methyl benzophenone
2,2'-dihydroxy benzophenone
2-hydroxy-4-isopropoxy benzophenone
2-hydroxy-4'-isopropoxy benzophenone
2-hydroxy-4-ethoxy benzophenone
2-hydroxy-4,4'-dimethoxy benzophenone
2-hydroxy-4-ethoxy-4'-methyl benzophenone
2,2'-dihydroxy-4-methoxy-4'-ethoxy benzophenone
umbelliferone(7-hydroxy coumarin)
umbelliferone acetic acid ethyl ester, and the like.

The new polymers of this invention comprising the vinyl-carboxylic acid anhydride and the aryl hydroxide are in general prepared by reacting the two components, preferably in an inert solvent, employing moderate heat. The temperature of the reaction may vary from room temperature up to about 200° C., depending upon the particular solvent used. Conveniently, the reaction is carried out by refluxing the reaction mixture. Suitable inert solvents include polar compounds such as ethers and ketones. Non-polar solvents may also be used even absent high solubilizing properties. The preferred solvent is acetone. The ratio of the reactants, namely the vinyl-carboxylic anhydride and the aryl hydroxide stabilizer, may vary from about 200:1 to about 5:1, on a molar basis. Within this range, it is preferred to employ molar amounts within the ratios of about 100:1 to about 15:1, with about a 50:1 molar ratio being the most preferred, it being clearly understood, however, that excellent results are obtained within the entire disclosed range.

The basic polymer as prepared in the manner and with the reactants described above may be further modified, and preferably so, to give additional valuable and improved properties thereto. Such modifications include esterification and/or amidation of the stabilized form of the interpolymer, as well as cross-linking and interaction with other vinyl polymers, and particularly polyvinyl lactams.

The esterification reactions may be carried out with any alcoholic hydroxyl compound such as the aliphatic mono- and polyhydric alcohols and the aromatic alcohols, both mono and polyhydric. These include:

methanol
ethanol
n-propanol
amyl alcohol
n-octanol
lauryl alcohol
ethylene glycol
triethylene glycol
1,4-butanediol
1,6-hexanediol
p-cyclohexylene glycol
polyethylene glycols
polypropylene glycols, and
alkylene oxide reaction products with active hydrogen compounds.

The latter group comprises the nonionic products (usually surface active products) prepared from an alkylene oxide such as ethylene oxide, propylene oxide, butadient dioxide, epichlorohydrin, or some other equivalent precursor or source of alkylene oxide or its equivalent with alcohols, phenols, amines, amides, carboxylic acids, thioalcohols, thiophenols, and the like. Such reactive hydrogen compounds and the oxyalkylation thereof are well known as well as their preparation. Examples of such products and processes can be found in United States Patents 1,970,578 and 2,213,477 among others and these are specifically incorporated by reference in this description.

The preferred ester-forming reactants are the nonionics derived from alkylated phenols and the higher aliphatic alcohols, the latter containing at least about 8 carbon atoms and preferably at least about 12 carbon atoms. The alkylated phenols are preferably those containing at least about 6 carbon atoms in the alkyl moieties. The alkylene oxide content of the nonionics should be not less than about 6 moles of alkylene oxide per mole of the reactive hydrogen compound. It is preferred that the alkylene oxide content be in the range of from about 10 moles to about 100 moles thereof per mole of the other reactant. It is also preferred that the alkylene oxide be ethylene oxide, alone or in conjunction with other oxyalkylating reagents, and in the latter situation, the amount of oxyethyl groups should comprise no less than about 25% of the total number of oxyalkyl groups present in the nonionic compound.

Particularly suitable nonionic compounds include the following:

nonyl phenol plus 10 moles ethylene oxide
nonyl phenol plus 20 moles etheylene oxide
nonyl phenol plus 35 moles ethylene oxide
nonyl phnol plus 40 moles ethylene oxide
nonyl phenol plus 80 moles ethylene oxide
nonyl phenol plus 10 moles propylene, then 10 moles ethylene oxide
nonyl phenol plus 8 moles propylene oxide, then 35 moles ethylene oxide
nonyl phenol plus 5 moles butylene oxide, then 25 moles ethylene oxide
diisobutyl phenol plus 25 moles ethylene oxide
dinonyl phenol plus 12 moles ethylene oxide
dinonyl phenol plus 30 moles ethylene oxide
tetradecyl phenol plus 20 moles ethylene oxide
dodecyl alcohol plus 15 moles ethylene oxide
oxotridecyl alcohol plus 10 moles ethylene oxide
oxotridecyl alcohol plus 40 moles ethylene oxide.

In addition to the use of the foregoing ester-forming compounds singly, it is often desirable to employ such compounds in combination, particularly, combinations of the nonionics with either a monohydric or a polyhydric alcohol.

The total concentration of the esterifying alcohol may vary within wide limits. As little as about 0.1 mole of alcohol per mole of interpolymer gives significantly improved results. The upper limit is of course governed by the theoretical amount necessary to effect substantially complete esterification. With the simple, lower molecular weight alcohols equimolar amounts are generally sufficient. The use of the higher molecular weight products, such as the nonionics requires a considerable excess over the stoichiometric amount to effect any substantial degree of conversion. Again, however, up to about 5 moles of nonionic compound per mole of interpolymer yield outstanding modified polymers.

As described above, the interpolymers may be amidated as an alternative to or in addition to being esterified. It is preferred that mixtures of partial esters and amidated products be employed rather than a partial ester-partial amide conversion on one polymer chain.

The amines which may be used in the practice of the present invention, and which are, indeed, preferred, are primary and secondary amines, and most preferred within these groups are the hydroxy amines. The latter may be simple hydroxy amines such as:

monoethanolamine
diethanolamine
aminoethyl ethanolamine
ethyl ethanolamine
hydroxypropyl ethanolamine
monopropanolamine
aminoethyl propanolamine
butanolamine
hydroxyethyl monobutanolamine
dibutanolamine
propyl butanolamine
butyl monopropanolamine
aminobutyl monobutanolamine
monopentanolamine
ethyl monopentanolamine
aminoethyl monopentanolamine
hydroxyethyl monopentanolamine, and the like.

In addition to the above types of hydroxy amines, one may also employ oxyalkylated amines which contain a plurality of oxyalkylene groups and which terminate in an hydroxy group. Examples of suitable amines include both aliphatic and aromatic amines, as described in United States Patent 2,174,762. The latter patent is hereby incorporated by reference in this description.

The amine and/or hydroxy amine reaction product with the maleic anhydride interpolymers are then reacted with fatty acids, and preferably those containing more than 8 carbon atoms, such as:

lauric acid
oleic acid
decanoic acid
linolenic acid, and the like.

Still another modification of the interpolymers includes reaction with polyvinyl lactams, such as polyvinyl pyrrolidone, polyvinyl morpholinone, polyvinyl caprolactam, polyvinyl oxazolidinone, etc., and the various substituted ring systems, especially the alkyl derivatives. The polyvinyl lactams are characterized by K values similar in scope to the maleic interpolymer.

A final supplemental additive is 8-hydroxy quinoline from minor amounts up to about 1 mole per each 4 moles of the maleic anhydride interpolymer.

Among the pesticides which are herein contemplated and as exemplifying, in particular, insecticides, fungicides, nematocides, herbicides, and the like, mention may be made of the following:

DDT
chlordan
Dieldrin
TDE (dichlorodiphenyl dichloroethane)
methoxychlor
heptachlor
gamma benzene hexachloride
Isolan (1-isopropyl-3-m-ethyl pyrazolyl-5 dimethyl carbamate)
Aldrin (1,2,3,4,10,10 - hexachloro - 1,4,4a,5,8,8a - dimethanonaphthalene)
Endrin (1,2,3,4,10,10 - hexachloro - 6,7 - epoxy - 1,4,4a, 5,6,7,8,8a - octahydro - 1,4 - endo - 5,8 - dimethanonaphthalene)
Isodrin (1,2,3,4,10,10 - hexachloro - 1,4,4a,5,8,8a - hexahydro-1,4-endo-5,8-dimethanonaphthalene)
Maneb (manganese ethylene bisdithiocarbamate)
Nabam (disodium analog of maneb)
Ferbam (ferric dimethyl dithiocarbamate)
Ziran (zinc analog of ferbam)
Captan (N - trichloromethylmercapto-4-cyclohexane-1,2-dicarboximide)
Karathane (2,4-dinitro-6-capryl phenol crotonate)
Aramite (butyl phenoxyisopropyl chloroethyl sulfite)
Ovotran (p-chlorophenyl-p-chlorobenzenesulphonate)
Sulphenone (p-chlorodiphenyl sulphine)
dichlorophenyl benzenesulphonate
parathion
dimethyl parathion
Demeton (O,O-diethyl-O-2-ethylmercaptoethyl thiophosphate)
O,O-diethyl bis(dimethylamide) pyrophosphate, sym., and unsym.
diethoxythiophosphoryl tetramethyl-diamido phosphate
α-diethoxyphosphinodithioacetylurea
α-dimethoxyphosphinodithioacetylurea
diethoxyphosphinodithioacetamide
dimethoxyphosphinodithioacetamide
bis(dimethylamido) phosphoryl fluoride
bis(dimethylamido) phosphoryl oxide
2-chlorovinyl diethyl phosphate
sodium fluoroacetate
2,4-D
2,4,5-T
chloro IPC
phenyl mercuric acetate
Nemagon (1,2-dibromo-3-chloropropane)
D'uron
Monuron
Simazine
Dalapon
EPTAM (ethyl N,N-di-n-propyl-thiocarbamate)
aminotriazole
Thimet (O,O-diethyl-S-(ethylthiomethyl) phosphorodithioate)
Dowco 109 (O - (4 - tert.butyl-2-chlorophenyl)O-methyl methyl phosphoro-amidothionate) and its oxygen analog
TMTD
Tetramethyl thiuram disulphide
Tetramethyl thiuram monosulphide
2,2-dichloropropionic acid
trichloropropionic acid
the alkali metal (e.g. lithium, sodium, potassium, etc.) salts of the chloropropionic acids, and ammonium salts
the amine (methyl amine, ethylamine, diethylene triamine, triethylene tetramine, benzyl amine, aniline, monoethanolamine, lauryl amine, mixed fatty amines, etc.) salts of the chloropropionic acids
2,2-dichloropropionamide
trichloropropionamide
conventional substituted derivatives of the propionamides wherein alkyl, the same or different, hydroxyalkyl, same or different, aryl, substituted aryl etc., replace one or both hydrogen atoms of the amide
esters of the chloropropionic acids wherein the esterifying moiety is alkyl, aryl, and the substituted forms thereof
the zinc, cadmium, manganese, nickel, iron, etc. salt reaction products with the thiocarbamates and the bisdithiocarbamates, such as Nabam and the like.

The following examples will serve to illustrate the present invention without being deemed limitative thereof. All parts and proportions referred to herein and in the appended claims are by weight unless otherwise indicated.

Example 1-A

One part of a 1:1 interpolymer of methyl vinyl ether-maleic anhydride ($\mu_{sp.}=0.5$) is reacted with 0.1 part of 2,2'-dihydroxy-4,4'-dimethoxy benzophenone, one part of 8-hydroxy quinoline and 10 parts of the condensation product of 1 mole of nonyl phenol with 40 moles of ethylene oxide. The reaction is carried out by adding all components except the interpolymer to 30 parts of acetone and while heating gently (below the boiling point of the acetone), gradually add the interpolymer with stirring. After the addition is complete, 0.01 part of azobisisobutyronitrile are added and the mixture is then heated to reflux for 15 minutes. The reaction mixture is then cooled to room temperature and the acetone is then removed by evaporation while stirring the mass.

Example 1-B

Thirty parts of a solid pesticide, o-isopropylphenyl-N-methyl carbamate are placed in a ball mill with about 70 parts of a highly purified petroleum oil and 2 parts of a finely divided attapulgus clay, and milled for 10 hours.

Example 1-C

Ninety parts of the product from Example 1-B are mixed with vigorous agitation with 10 parts of the product from Example 1-A. The resultant composition is a thick slurry which mixes with water. When sprayed on soil or plants, there is obtained an appreciably longer retention of pesticidal activity than obtainable with normal unmodified pesticidal material.

Example 2

Example 1-A is repeated employing the following alkyl vinyl ether-maleic anhydride interpolymers:

(a) methyl vinyl ether-maleic anhydride (1:1 mole ratio: $\mu_{sp.}=1.2$)
(b) methyl vinyl ether-maleic anhydride (1:1 mole ratio: $\mu_{sp.}=1.2$)
(c) ethyl vinyl ether-maleic anhydride (1:1 mole ratio: $\mu_{sp.}=1.7$)
(d) methyl vinyl ether-maleic anhydride (1.1:1 mole ratio: $\mu_{sp.}=1.6$)
(e) methyl vinyl ether-maleic anhydride (1.25:1 mole ratio: $\mu_{sp.}=1.9$)
(f) methyl vinyl ether-maleic anhydride (0.8:1 mole ratio: $\mu_{sp.}=2.1$)
(g) iso-octyl vinyl ether-maleic anhydride (1:1 mole ratio: $\mu_{sp.}=1.3$)

Examples 3a-3q

Examples 1-A, 1-B, and 1-C are repeated employing, however, the products of 2(a) through 2(g) in lieu of the product of Example 1-A. Similarly improved pesticidal results are obtained.

Example 4-A

Two parts of ammonium lignate are dissolved in about 20 parts of acetone and then 5 parts of a methyl vinyl ether-maleic anhydride interpolymer (1:1 mole ratio: $\mu_{sp.}=0.5$) is slowly added with vigorous stirring.

Example 4-B

A pesticide mixture is prepared by ball milling for about six hours the following indicated ingredients:

50 parts N-(4-phenoxy) phenyl,N',N'-dimethyl urea,
3 parts atta-gel,
5 parts urea, and
42 parts water.

Example 4-C 95 parts of the mixture prepared in Example 4-B are milled with 5 parts of the product of Example 4-A. A slurry results which is readily dilutable with water. When sprayed on plants or soil, there is excellent retention of pesticidal activity and obvious protection and stabilization of the pesticide against the ravages of nature.

Example 5-A

One part of the maleic-anhydride interpolymer of Example 1-A is reacted with the following indicated ingredients:

1 part 8-hydroxy quinoline,
0.1 part 2,2',4,4'-tetrahydroxybenzophenone, and
5 parts of a condensation product of 1 mole of nonyl phenol with 40 moles of ethylene oxide.

40 parts of methanol are used as a solvent and coreactant along with a trace (about 0.01 part) of azobis-isobutyronitrile. The reaction is carried out for about one hour during which time the mixture is heated gently (30-40° C.).

Example 5-B 70 parts of the product from Example 5-A are ball milled with 30 parts of N-(4-phenoxy) trifluoromethyl-N',N'-dimethyl urea for eight hours. The resultant product is a thick slurry which suspends well in water and which when dry yields an outstandingly stable and long-active pesticidal composition, film or coating.

In place of the ball milling technique, the mixture may, instead, be run through a colloid mill having decreasing orifices whereby equivalent results are obtained.

Example 6-A 1 part 8-hydroxy quinoline,
0.1 part 2-hydroxy-4-methoxy benzophenone, and 10 parts of a 50% solution in acetone of the condensation product of 1 mole of phenol with 20 moles of ethylene oxide are dissolved in 20 parts ethylene glycol.

One part of the maleic anhydride interpolymer of Example 1-A is then slowly stirred into the above mixture along with about 0.001 part of azobis-isobutyronitrile catalyst. The mixture is then heated to reflux for thirty minutes, after which the acetone is removed by evaporation while the reaction mass is being stirred.

Example 6-B 30 parts of Carbaryl (1-naphthyl-N-methyl carbamate) are ball milled with:

3 parts atta-gel, and
67 parts methanol for six hours. As in the previous Example 5-B, a colloid mill may be employed in place of a ball mill with similar results.

Example 6-C 80 parts of the product prepared in Example 6-B are milled with 20 parts of the product made in Example 6-A. The mixture is a thick, non-separating slurry. This mixture is thinned with water to a Carbaryl concentration of 2% (by weight based on the weight of the total thinned mixture) and sprayed on plants. Thin, adherent films are formed which maintain exceptionally prolonged pesticidal activity.

Examples 7-A through 7-E

The procedures of Examples 6-A, 6-B, and 6-C are repeated except that in place of ethylene glycol, used in Example 6-A, equal parts of the following polyhydric alcohols are employed:

A. Propylene glycol
B. Glycerin
C. 1,4-butanediol
D. 1,6-hexanediol
E. Ethylene thioglycol The results are comparable to those obtained in Examples 6-A, 6-B, and 6-C.

Examples 8-A through 8-G

Example 6, all parts, is repeated employing the following maleic anhydride interpolymers, in equal amounts, in place of the one used in that example:

A. Methyl vinyl ether-maleic anhydride (1:1 mole ratio: $\mu_{sp.}=1.6$)
B. Ethyl vinyl ether-maleic anhydride (1:1 mole ratio: $\mu_{sp.}=2.1$)
C. Methyl vinyl ether-monochloro maleic anhydride (1:1 mole ratio: $\mu_{sp.}=1.4$)
D. Methyl vinyl ether-methyl maleic anhydride (1:1 mole ratio: $\mu_{sp.}=1.8$)
E. Ethyl vinyl ether-phenyl maleic anhydride (1:1 mole ratio: $\mu_{sp}=2.2$)
F. Isobutyl vinyl ether-maleic anhydride (1:1 mole ratio: $\mu_{sp.}=0.9$)
G. Tetradecyl vinyl ether-maleic anhydride (1:1 mole ratio: $\mu_{sp.}=0.6$)

Excellent results are forthcoming in all instances.

Examples 9–A through 9–H

All parts of Example 6 are once again repeated using the following aryl hydroxy stabilizers in equivalent amounts:

A. 2,2'-dihydroxy benzophenone
B. 2-hydroxy-4,4'-dimethoxy benzophenone
C. (2'-hydroxyphenyl)benzotriazole
D. (2'-hydroxy-5'-methyl phenyl)benzotriazole
E. (2'-hydroxy-5'-chloro phenyl)benzotriazole
F. Sodium lignate
G. Potassium lignate
H. Ammonium lignate Outstanding, stable and highly active pesticidal compositions result.

Examples 10–A through 10–E

Examples 9–A, 9–D and 9–H are each repeated except that ten parts of the following indicated nonionic compounds are used in place of the same parts of the phenol plus 20 moles of ethylene oxide condensate used in those examples, with similarly improved results.

A. Nonyl phenol (1 mole) plus 10 moles ethylene oxide
B. Nonyl phenol (1 mole) plus 80 moles ethylene oxide
C. Di-isobutyl phenol (1 mole) plus 30 moles of ethylene oxide
D. Oxotridecyl alcohol (1 mole) plus 10 moles of ethylene oxide
E. Nonyl phenol (1 mole) plus 10 moles of propylene oxide then plus 10 moles of ethylene oxide.

Example 11–A

A polymer reaction product is formed from the following components, and in accordance with the indicated procedure:

1 part 8-hydroxy quinoline
0.1 part 2,2'-dihydroxy-4,4'-dimethoxy benzophenone
10 parts nonyl phenol (1 mole) plus 20 moles of ethylene oxide condensate are dissolved in about 20 parts of methanol. There are then added slowly, with vigorous stirring, two parts of the maleic anhydride interpolymer of Example 1–A along with 0.005 part of azobis-isobutyronitrile. After the additions are complete, the mixture is heated to reflux, and thereafter cooled to room temperature.

Example 11–B 10 parts of O,O-dimethyl-O-(2,2-dichlorovinyl)phosphate are mixed with 90 parts of the product of Example 11–A. A thick syrup results which is readily suspendable in water. As in previous examples, the composition provides for high retention of insecticidal activity.

Example 12–A

One mole of finely powdered interpolymer of vinyl methyl ether-maleic anhydride (1:1 mole ratio: $\mu_{sp.}=0.5$) is slowly stirred into two moles of ethyl alcohol. After the addition is complete, 0.1 mole of concentrated sulphuric acid is added and the mixture is then slowly heated to reflux. Refluxing is continued for 30 minutes, and the resultant clear solution is then cooled to room temperature. The half ester (ethyl) is thereby produced.

Example 12–B

Equimolar amounts of the same interpolymer used in part A of this example and aminoethyl ethanolamine are slowly mixed together. The ensuing reaction is strongly exothermic and cooling is required to moderate the reaction. To this reaction product there is added about an equivalent weight of lauric acid, and the mixture heated moderately (about 60° C.) with vigorous agitation. 80 parts of this product are then milled with 20 parts of urea to give a readily handled material.

Example 12–C

The following ingredients are heated together with strong agitation:

5 parts 8-hydroxy quinoline,
0.5 part 2,2'-dihydroxy-4,4'-dimethoxy benzophenone,
40 parts ethylene glycol, and
20 parts of a condensation product of 1 mole nonyl phenol with 40 moles of ethylene oxide.

There are then added:

5 parts of an interpolymer of methyl vinyl ether-maleic anhydride (1:1 mole ratio: $\mu_{sp.}=0.5$), and
0.005 part azobis-isobutyronitrile.

The mixture is heated to 100° C., with vigorous stirring, for ten minutes, and then permitted to cool.

Example 12–D

One part of Trichlorfon (O,O-dimethyl-2,2,2-trichloro-1-hydroxyethyl phosphonate) is added to a mixture composed of:

40% product of Example 12–A
5% product of Example 12–B
55% product of Example 12–C.

The resultant formulation is a colloidal dispersion that is extremely stable for long periods of time during storage and when sprayed upon animals or plants.

Examples 13–A through 13–E

Example 12–D is repeated employing the following parts of the pesticide Trichlorofon:

A. 2 parts
B. 5 parts
C. 10 parts
D. 40 parts
E. 80 parts.

Similar outsanding and excellent results are achieved.

Example 14–A

The following ingredients are added to 200 ml. of methanol and refluxed for 30 minutes:

11 grams 8-hydroxy quinoline,
1.1 grams 2,2'-dihydroxy-4,4'-dimethoxy benzophenone,
10 grams of an interpolymer of methylvinyl ether-maleic anhydride (1:1 mole ratio: $\eta_{sp}=0.5$), and
1 gram concentrated sulphuric acid.

After cooling a heavy precipitate forms in the excess, unreacted methanol.

Example 14–B 70 parts of the slurry formed in Example 14–A and 30 parts of heptachlor are milled together until a finely ground slurry results. Five parts of urea are then added, and the resulting material is applied to plants. Stable films of high insecticidal activity are produced. The activity remains high for significantly longer periods than normal formulations.

Example 15–A

The procedure of Example 14–A is repeated with the addition to the refluxing mixture of 10 parts of the nonionic condensation product of 1 mole of nonyl phenol with 40 moles of ethylene oxide. At the conclusion of that procedure there is added a trace of azobis-isobutyronitrile (0.001 part), and then 0.5 part of homopolymeric N-vinyl-2-pyrrolidone (K=13).

Example 15–B 20 parts of the resinous product of Example 15–A are mixed with:

50 parts mineral oil, and
30 parts methoxychlor (previously air milled).

The resultant mixture is vigorously milled to yield a slurry which is readily dispersible in water, and from which long lasting insecticidally active films and coatings are attainable.

Examples 16–A through 16–E

Both parts of Example 15 are repeated except that in part A, the homopolymer of vinyl pyrrolidone is replaced by the following lactam polymers:

A. Polyvinyl pyrrolidone (K of 30)
B. Polyvinyl morpholinone (K of 45)
C. Polyvinyl oxazolidinone (K of 25)
D. Polyvinyl caprolactam (K of 70)
E. Vinyl pyrrolidone (70%)-vinyl acetone (30%) copolymer.

The results are comparable to Example 15.

Examples 17–A through 17–M

Examples 15 and 16–A through 16–E are repeated separately, and as indicated, with 10 parts of the indicated nonionic condensates in place of the one used in those examples:

| Repeat of Example | | Nonionic Condensate |
| --- | --- | --- |
| A | 15 | Nonyl phenol plus 20 moles ethylene oxide. |
| B | 15 | Dinonyl phenol plus 60 moles ethylene oxide. |
| C | 15 | Tetradecyl phenol plus 10 moles ethylene oxide. |
| D | 15 | Oxotridecyl alcohol plus 25 moles ethylene oxide. |
| E | 16–A | Dinonyl phenol plus 60 moles ethylene oxide. |
| F | 16–A | Oxotridecyl alcohol plus 5 moles propylene oxide then 15 moles ethylene oxide. |
| G | 16–B | Tetradecyl phenol plus 10 moles ethylene oxide. |
| H | 16–B | Nonyl phenol plus 20 moles ethylene oxide. |
| I | 16–C | Oxotridecyl alcohol plus 25 moles ethylene oxide. |
| J | 16–D | Nonyl phenol plus 20 moles ethylene oxide. |
| K | 16–D | Dinonyl phenol plus 60 moles ethylene oxide. |
| L | 16–E | Dinonyl phenol plus 60 moles ethylene oxide. |
| M | 16–E | Oxotridecyl alcohol plus 25 moles ethylene oxide. |

Example 18

20 parts of the resinous product of Example 15–A, in finely divided form, are milled with the following ingredients:

30 parts TMTD (tetramethylthiuram disulfide),
5 parts Endrin,
5 parts hexamethylenetetramine, and
40 parts glycerin.

One part of the above mixture is dispersed in 100 parts of water and sprayed on the trunks of trees. The rodent repellant activity of the applied composition remains high for an exceptionally long period of time.

Examples 19–A through 19–E

Example 18 is repeated except that the resinous product used is that following the procedure of Example 15–A with the following polymeric lactams replacing the homopolymer used in 15–A:

A. Polyvinyl pyrrolidone (K of 70)
B. Polyvinyl caprolactam (K of 30)
C. Polyvinyl oxazolidinone (K of 52)
D. Poly-N-vinyl-3,5-dimethyl pyrrolidone (K of 40)
E. Vinyl pyrrolidone (93%)-vinyl stearate (7%) copolymer.

Results are obtained in each of these examples which are comparable to those of Example 18.

Example 20

Both parts of Example 11 are repeated except that in Example 11–A, in place of two parts of the maleic anhydride interpolymer, there are used, separately, one, three, four, and five parts respectively. Excellent, highly retentive insecticidal activity is obtained in each instance.

Example 21

Both parts of Example 11 are again repeated except that in Example 11–B, in place of 10 parts insecticide and 90 parts of Example 11–A product, there are used:

A. 5 parts insecticide and 95 parts 11–A product
B. 25 parts insecticide and 75 parts of Example 11–A product
C. 50 parts insecticide and 50 parts of Example 11–A product
D. 80 parts insecticide and 20 parts of Example 11–A product.

Results comparable, in prolonged insecticidal activity, to those obtained in Example 11 are forthcoming.

Example 22

Example 12, all four parts, are repeated except that in 12–A, two moles of n-propyl alcohol are used in lieu of ethyl alcohol. A corresponding partial n-propyl ester is produced. The final results, in repeating 12–D, are outstanding.

Examples 23–A through 23–D

Example 22 is repeated with similarly improved results employing, in place of n-propyl alcohol, two moles of the following alcohols:

A. Isopropyl alcohol
B. n-Butyl alcohol
C. Isobutyl alcohol
D. Isooctyl alcohol.

Examples 24–A through 24–E

Example 12, all parts, is still once more repeated, employing in Example 12–B, the following amines, in equivalent amounts, in place of the aminoethyl ethanolamine used in Example 12–B:

A. Monoethanolamine
B. Diethanolamine
C. Ethyl ethanolamine
D. Monopropanolamine
E. Monopentanolamine.

The resultant compositions, in each case, are outstanding and comparable to that produced in Example 12–D.

Examples 25–A through 25–D

All four parts of Example 4 are again repeated, with similarly improved results, using however, in Example 12–B, the following indicated fatty acids in place of but in amounts equivalent to the lauric acid used in Example 12–B:

A. Octanoic acid
B. Stearic acid
C. Oleic acid
D. Linoleic acid.

Examples 26–A through 26–C

The procedures of Examples 15–A and 15–B are repeated, with similarly improved results, using however, in Example 15–A, the following amounts of the lactam polymer in place of the 0.5 part employed in that example:

A. 1.0 part
B. 2.0 parts
C. 5.0 parts.

Examples 27–A through 27–J

Each of Examples 16–A through 16–E is repeated with the following indicated amounts of lactam polymer in place of the 0.5 part used in said examples:

|   | Lactam Polymer of Example | Parts |
|---|---|---|
| A | 16–A | 1.5 |
| B | 16–A | 3.5 |
| C | 16–B | 1.0 |
| D | 16–B | 4.0 |
| E | 16–C | 1.0 |
| F | 16–C | 5.0 |
| G | 16–D | 2.5 |
| H | 16–D | 4.5 |
| I | 16–E | 1.0 |
| J | 16–E | 3.0 |

Similar results, superior in performance, are obtained as in Examples 16–A through 16–E.

Example 28

A mixture of the following ingredients is suspended in 54 parts of ethylene glycol containing a trace amount (0.005 part) of azobis-isobutyronitrile:

30 parts sulphonated fatty oleic acids (red oil)
10 parts of the reaction product of:
    (a) 1 mole of the interpolymer of methyl vinyl ether with maleic anhydride (1:1 mole ratio: specific viscosity $\eta_{sp.}=0.5$),
    (b) propylamine (1 mol), and
    (c) a neutralizing amount of lauric acid (following the general procedure of Example 12B)
2 parts urea
1 part 2,2'-dihydroxy-4,4'-dimethoxy benzophenone, and
1 part 8-hydroxy quinoline.

There is then added 2 parts of the same maleic anhydride interpolymer used in (a) above with a trace of azobis-isobutyronitrile (0.002 part). The mixture is heated to 100° C. and held at that temperature for 15 minutes. To the resultant resinous product there is added one part of Trichlorfon per 99 parts of the said resinous product. Excellent, prolonged pesticidal activity is obtained.

Examples 29–A through 29–E

All parts of Example 12 are repeated except that in Example 12–D the following parts of pesticide are used, along with the indicated parts of the same mixture of products of Examples 12–A, 12–B, and 12–C:

A. 5 parts pesticide—95 parts resinous mixture
B. 10 parts pesticide—90 parts of resinous mixture
C. 30 parts pesticide—70 parts of resinous mixture
D. 50 parts pesticide—50 parts of resinous mixture
E. 80 parts pesticide—20 parts of resinous mixture.

Example 30

Example 28 is again repeated using the ratios of pesticide to resinous mixture employed in Examples 29–A through 29–E, in place of the 1:99 mixture of Example 28.

Examples 31–A through 31–L

Example 1, all parts, is repeated, using the following pesticides in place of the one Example 1:

A. DDT
B. Chlordane
C. Heptachlor
D. Aldrin
E. Maneb
F. Ferbam
G. Captan
H. Aramite
I. Isolan
J. Sodium fluoroacetate
K. Phenyl mercuric acetate
L. Aminotriazole.

In all instances, excellent results are obtained.

Examples 32–A through 32–J

Example 1, all parts, is repeated employing in place of the surface active nonyl phenol-40 mole ethylene oxide condensate of that example, the following:

A. Isoctyl thioalcohol (iso-octyl mercaptan)-10 moles ethylene oxide condensate
B. Decanoic acid amide-20 moles ethylene oxide condensate
C. Tetradecyl sulphonamide-15 moles ethylene oxide condensate
D. p-(n-hexyl)benzene sulphonamide-12 moles ethylene oxide condensate
E. o-(iso-octyl) thiophenol-25 moles ethylene oxide condensate
F. n-dodecyl amine-30 moles ethylene oxide condensate
G. Stearamide-10 moles propylene oxide followed by 15 moles ethylene oxide condensate
H. Eicosyl sulphonamide-5 moles butylene oxide followed by 25 moles ethylene oxide condensate
I. 3,5-di-tertiary butyl thiophenol-8 moles butylene oxide, followed by 8 moles propylene oxide, followed by 24 moles ethylene oxide condensate
J. Lauric acid-10 moles propylene oxide followed by 10 moles of butylene oxide, followed by 20 moles ethylene oxide.

The results are comparable with Example 1.

Example 33

One mole of Nabam is mixed with sufficient water to give an active ingredient concentration of 5%. There are then added:

0.01 mole ammonium lignate
1.0 mole urea
0.01 mole nonyl phenol-ethylene oxide condensate of Example 1
0.001 mole of the methyl vinyl ether-maleic anhydride interpolymer of Example 1, and
2.0 moles of zinc acetate.

The mixture is vigorously stirred while heating slightly (to about 50° C.).

The resultant reaction product is then further diluted to a concentration of 1% active pesticide. Spray application to plants and soil yields similar excellent results as in the preceding examples.

Example 34

Example 33 is repeated using in place of Nabam the following:

(a) ammonium salt of Nabam
(b) ammonium isopropylamine diamine thiocarbamate
(c) dimethylamine thiocarbamate.

Results comparable to that of Example 33 are obtained.

Example 35

Example 33 is again repeated using the following metal salts in place of zinc acetate of that example:

(a) zinc chloride
(b) manganese chloride
(c) ferric chloride
(d) ferric nitrate
(e) zinc nitrate
(f) nickelous nitrate
(g) ferrous sulphate.

Outstanding increased pesticidal activity and retention is observed when the compositions are applied to plants and soil.

Example 36

Example 1 is repeated using the following amounts of the methyl vinyl ether-maleic anhydride interpolymer in place of the one part thereof used in that example:

(a) 2 parts
(b) 3 parts
(c) 4 parts
(d) 5 parts
(e) 7 parts
(f) 10 parts.

The results are excellent insofar as pesticidal activity retention is concerned, such activity being much more prolonged than the usual activity of the pesticide.

This invention has been disclosed with respect to certain preferred embodiments and various modifications and variations thereof will become obvious to the person skilled in the art. It is to be understood that such modifications and variations are to be included within the spirit and scope of this invention.

I claim:
1. The reaction product of
   (1) about 0.5 to 10 mols of an interpolymer of
      (a) an alkyl vinyl ether of from 1 to 18 carbon atoms in the alkyl moiety with
      (b) an $\alpha,\beta$-ethylenically unsaturated dicarboxylic acid anhydride, said interpolymer having a K value of about 10 to 200, and
   (2) 100 moles of an aryl hydroxy compound selected from the group consisting of 2-hydroxybenzophenones, alkali lignates, hydroxy coumarins, and oxyphenyl benzotriazoles.
2. The reaction product of claim 1 wherein said alkyl vinyl ether is methyl vinyl ether.
3. The reaction product of claim 2 wherein said acid anhydride is maleic anhydride.
4. The reaction product of claim 1 wherein the interpolymer (1) contains the components (a) and (b) in a molar ratio of about 1:1.
5. The reaction product of claim 3 wherein the interpolymer (1) contains the components (a) and (b) in a molar ratio of about 1:1.
6. The reaction product of claim 5 wherein the aryl hydroxy compound (2) is a 2-hydroxy benzophenone.
7. The reaction product of claim 1 wherein the interpolymer (1) contains ester groups.
8. The reaction product of claim 7 wherein the esterifying moiety is provided by a monohydric alcohol.
9. The reaction product of claim 8 wherein the monohydric alcohol is a lower aliphatic alcohol.
10. The reaction product of claim 7 wherein the esterifying moiety is provided by a polyhydric alcohol.
11. The reaction product of claim 8 wherein the esterifying moiety is provided by a nonionic, surface active, polyoxyalkylenated reactive hydrogen-containing organic compound, said organic compound being selected from the group consisting of alcohols, thioalcohols, phenols, thiophenols, amines, amides, and carboxylic acids.
12. The reaction product of claim 11 wherein the surface active organic compound is an alkyl phenol-ethylene oxide condensate containing about 10 to 100 moles of ethylene oxide per mole of phenol.
13. The reaction product of claim 1 wherein the interpolymer (1) contains amide groups.
14. The reaction product of claim 1 wherein the interpolymer (1) contains ester and amide groups.
15. The reaction product of claim 1 which is further reacted with 8-hydroxy quinoline.
16. The reaction product of:
   (1) an interpolymer of methyl vinyl ether with maleic anhydride in a 1:1 molar ratio, said interpolymer having a K value of about 10 to 100,
   (2) a 2-hydroxy benzophenone,
   (3) a nonionic, surface active polyoxyethylenated reactive hydrogen-containing compound, and
   (4) 8-hydroxy quinoline,
the said components (1) and (2) being present in a mole ratio of from about 100:1 to about 10:1 in said reaction product, the said component (3) being present to the extent of at least about 0.1 mole per mole of interpolymer, and the said component (4) being present to the extent of at least about 0.01 mole per mole of interpolymer.
17. The reaction product of claim 16 wherein the nonionic, surface active compound is an alkyl phenol-ethylene oxide condensate.
18. A stabilized pesticidal composition comprising an agricultural insecticide, fungicide, nematocide, or herbicide and a reaction product as defined in claim 1.
19. A composition as defined in claim 18 containing an organic agricultural insecticide.

No references cited.

WILLIAM H. SHORT, *Primary Examiner.*

L. LEE, *Assistant Examiner.*